US008480982B2

(12) United States Patent
Mak et al.

(10) Patent No.: US 8,480,982 B2
(45) Date of Patent: Jul. 9, 2013

(54) CONFIGURATIONS AND METHODS FOR CARBON DIOXIDE AND HYDROGEN PRODUCTION FROM GASIFICATION STREAMS

(75) Inventors: John Mak, Santa Ana, CA (US); Richard Nielsen, Laguna Niguel, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 375 days.

(21) Appl. No.: 12/526,617

(22) PCT Filed: Feb. 22, 2008

(86) PCT No.: PCT/US2008/002387
§ 371 (c)(1),
(2), (4) Date: Aug. 10, 2009

(87) PCT Pub. No.: WO2008/103467
PCT Pub. Date: Aug. 28, 2008

(65) Prior Publication Data
US 2010/0111784 A1 May 6, 2010

Related U.S. Application Data

(60) Provisional application No. 60/891,133, filed on Feb. 22, 2007.

(51) Int. Cl.
*B01J 8/04* (2006.01)
*B01D 53/52* (2006.01)

(52) U.S. Cl.
USPC ....................... 422/630; 423/242.1

(58) Field of Classification Search
USPC ............... 422/242.1, 630; 423/242.1
See application file for complete search history.

(56) References Cited

U.S. PATENT DOCUMENTS

| 2,177,068 | A | | 10/1939 | Hutchinson |
| 2,649,166 | A | | 8/1953 | Porter et al. |
| 2,863,527 | A | | 12/1958 | Herbert et al. |
| 2,926,751 | A | | 3/1960 | Kohl et al. |
| 3,031,287 | A | * | 4/1962 | Benson et al. ............. 48/197 R |
| 3,505,784 | A | | 4/1970 | Hochgesand et al. |
| 3,563,695 | A | | 2/1971 | Benson |
| 3,710,546 | A | * | 1/1973 | Grunewald et al. ............ 95/174 |
| 3,725,252 | A | * | 4/1973 | Maier ........................... 208/213 |
| 3,773,896 | A | | 11/1973 | Preusser et al. |
| 4,242,108 | A | * | 12/1980 | Nicholas et al. .............. 95/166 |
| 4,254,094 | A | | 3/1981 | Hegarty |
| 4,568,364 | A | | 2/1986 | Calstaun et al. |

(Continued)

FOREIGN PATENT DOCUMENTS

WO WO 2004026441 A1 * 4/2004
WO WO 2004058384 A1 * 7/2004

*Primary Examiner* — Jill Warden
*Assistant Examiner* — Huy-Tram Nguyen
(74) *Attorney, Agent, or Firm* — Fish & Associates, PC

(57) ABSTRACT

A syngas treatment plant is configured to remove sulfurous compounds and carbon dioxide from shifted or un-shifted syngas in a configuration having a decarbonization section and a desulfurization section. Most preferably, the solvent in the decarbonization section is regenerated and cooled by flashing, while the solvent is regenerated in the desulfurization section via stripping using external heat, and it is still further preferred that carbonylsulfide is removed in the desulfurization section via hydrolysis, and that the so produced hydrogen sulfide is removed in a downstream absorber.

14 Claims, 4 Drawing Sheets

U.S. PATENT DOCUMENTS

| | | | |
|---|---|---|---|
| 4,913,637 A * | 4/1990 | Lee | 422/612 |
| 5,110,444 A * | 5/1992 | Haun et al. | 208/89 |
| 5,137,550 A * | 8/1992 | Hegarty et al. | 95/174 |
| 5,832,712 A | 11/1998 | Ronning et al. | |
| 6,787,025 B2 * | 9/2004 | Mukherjee et al. | 208/89 |
| 7,635,408 B2 * | 12/2009 | Mak et al. | 95/187 |
| 2002/0121093 A1 | 9/2002 | Wallace et al. | |
| 2003/0181314 A1 | 9/2003 | Kranz | |
| 2005/0000360 A1 * | 1/2005 | Mak et al. | 95/236 |
| 2006/0110300 A1 | 5/2006 | Mak | |
| 2006/0150812 A1 * | 7/2006 | Mak et al. | 95/199 |
| 2006/0260191 A1 | 11/2006 | Van Den Berg et al. | |
| 2008/0184887 A1 * | 8/2008 | Mak | 95/174 |

* cited by examiner

CONFIGURATIONS AND METHODS FOR CARBON DIOXIDE AND HYDROGEN PRODUCTION FROM GASIFICATION STREAMS

This application claims priority to our U.S. provisional application with the Ser. No. 60/891,133, which was filed Feb. 22, 2007.

FIELD OF THE INVENTION

The field of the invention is hydrogen and carbon dioxide production from a syngas stream, and especially configurations and methods in which a sulfur scavenger and a solvent is employed to reduce carbon and sulfur emissions.

BACKGROUND OF THE INVENTION

Gasification of coal, residue oil, and other refinery waste is frequently integrated with combined-cycle power plants (IGCC) to produce additional electricity. The syngas from the gasification predominantly comprises $H_2$, $CO_2$, CO, $H_2S$ and COS is therefore often treated to remove sulfur where the syngas is used as fuel gas to the power plant. While such IGCC plants are reasonably efficient in upgrading low-grade carbonaceous products to generate electricity, significant carbon and sulfur emissions are often generated, particularly from the exhaust of the combustion gas turbines (e.g., sulfurous oxides, $CO_2$, etc.).

Numerous approaches have been undertaken to reduce $CO_2$ emissions, and an exemplary typical method is described in U.S. Pat. No. 5,832,712 to Ronning et al, where gas turbine exhaust is treated for $CO_2$ removal using a solvent. However, all or almost all of these processes tend to be cost prohibitive and energy inefficient due to the operation at atmospheric pressure and the relatively low $CO_2$ partial pressure in the gas turbine exhaust. Alternatively, one or more membranes can be used to physically separate $H_2$ and $CO_2$ from the syngas upstream of a gas turbine. Membrane systems are often highly adaptable with respect to gas volumes and product-gas specifications. However, where stringent $CO_2$ dioxide removal is required, membrane systems typically require multiple stages and recompression between the stages, which is often cost prohibitive.

In other approach, a chemical solvent is used that reacts with the acid gas to form a (typically non-covalent) complex with the acid gas. In processes involving a chemical reaction between the acid gas and the solvent, syngas is typically scrubbed with an alkaline salt solution of a weak inorganic acid as, for example, described in U.S. Pat. No. 3,563,695, or with alkaline solutions of organic acids or bases as, for example, described in U.S. Pat. No. 2,177,068. However, chemical solvents generally require extensive heating and lean solvent cooling and often further require high solvent recirculation, which increases proportionally with the acid gas concentration in the syngas. Therefore, such processes are suitable for treating unshifted syngas with low acid gas content but are problematic in treating shifted syngas that contains large amount of $CO_2$ (e.g., greater than 30 vol %).

In a still further approach, physical solvents are used for acid gas removal. Physical solvents are particularly advantageous where the syngas has relatively high $CO_2$ partial pressure (e.g., shifted syngas) as acid gas absorption increases proportionally with the $CO_2$ partial pressure. The physical absorption of the acid gases is further dependent upon the selective solvent physical properties, the feed gas composition, pressure, and temperature. For example, methanol may be used as a low-boiling organic physical solvent, as exemplified in U.S. Pat. No. 2,863,527. However, such solvent requires low temperature refrigeration for solvent cooling, which is energy intensive.

Alternatively, physical solvents may be operated at ambient or slightly below ambient temperatures, including propylene carbonates as described in U.S. Pat. No. 2,926,751 and those using N-methylpyrrolidone or glycol ethers as described in U.S. Pat. No. 3,505,784. While such solvents may advantageously reduce cooling requirements, most propylene carbonate-based absorption processes are very efficient especially in $CO_2$ removal from high pressure feed gas. In further known methods, physical solvents may also include ethers of polyglycols, and specifically dimethoxytetraethylene glycol as shown in U.S. Pat. No. 2,649,166, or N-substituted morpholine as described in U.S. Pat. No. 3,773,896. While use of physical solvents can significantly reduce the energy requirement, various difficulties still exist. Among other things, $CO_2$ and $H_2S$ removal are often inefficient and incomplete, failing to meet today's stringent emission requirements. Moreover, where the acid gas is $H_2S$, co-absorption of $CO_2$ is very high, which is problematic for downstream sulfur plants.

An exemplary known gas treatment configuration that employs a physical solvent for $H_2S$ removal is depicted in Prior Art FIG. 1, in which unshifted synthesis gas 1 is treated using a $H_2S$ selective solvent stream 9 in absorber 50. The rich solvent from absorber, stream 4, is reduced in pressure via valve 54, forming stream 10 that is then flashed to separator 55. Almost all of the $H_2$ and at least a portion of the $CO_2$ in the rich solvent are recovered by recycling the flashed gas to the absorber, using compressor 56 via streams 22 and 2. The flashed liquid stream 12 is further letdown in pressure via valve 57 to form stream 13, which is heated by heat exchanger 58 to form stream 14. The rich solvent is regenerated in regenerator 59 producing an acid gas stream 15 and a lean solvent 16. Reboiler 61 and cooler 60 are used to supply the heating and cooling requirements of regeneration. The lean solvent is further pumped by pump 62, cooled in exchanger 58 and 66 via streams 17 and 18, respectively, providing a cooled lean solvent stream 9 to the absorber. The treated syngas stream 6 is then used as fuel gas to an IGCC power plant 53 via stream 5, and optionally as feed gas 7 to a hydrogen purification unit 52 that may further include membrane separators and pressure swing absorption beds.

It should be recognized that in such configurations physical solvent treating is limited by physical equilibrium of the acid gases in the solvent. While physical solvent can be advantageously regenerated by reduction in pressure to some extent without the use of heat, physical solvents require costly low temperature refrigeration (e.g., −40° F. and lower) for removal of $H_2S$ and COS to low levels (e.g., below 4 ppmv). Almost all solvent processes co-absorb significant quantities of $CO_2$ in a $CO_2$ rich environment (e.g., shifted syngas) and consequently reduce their sulfur absorption capacity, and require higher solvent circulation and regeneration duties while generating undesirable $CO_2$ emissions. Unfortunately, such configurations also produce an acid gas enriched in $CO_2$ that is problematic for a downstream sulfur plant.

Consequently, although many configurations and methods for $H_2S$ and $CO_2$ removal from syngas are known in the art, all or almost all of them suffer from various disadvantages. Thus, there is still a need to provide methods and configurations for improved $H_2S$ and $CO_2$ removal, especially for syngas with high $CO_2$ content.

SUMMARY OF THE INVENTION

The present invention is directed to configurations and methods of treating syngas to remove acid gas, and especially to remove hydrogen sulfide and carbon dioxide. So treated syngas can then be used in various manners (e.g., combustion in IGCC power plant) and the carbon dioxide may be sequestered or liquefied for storage and/or transport. Most preferably, contemplated methods and plants have a desulfurization and decarbonization section in which separate absorbers absorb the acid gas components. Solvents are then regenerated in the respective sections by flashing and stripping, which provides significant energy savings.

In one aspect of the inventive subject matter, a plant comprises a gasification unit that provides syngas to a desulfurization section that includes a primary absorber upstream of a COS hydrolysis unit, which is upstream of a secondary absorber. The primary and secondary absorbers serially absorb H2S from the syngas in a first solvent to so produce a desulfurized syngas. A decarbonization section then receives the desulfurized syngas and uses an absorber in which CO2 is removed from the desulfurized syngas via a second solvent to so produce a H2 product stream. Typically, the first solvent is regenerated in the desulfurization section by stripping and the second solvent is regenerated in the decarbonization section by flashing.

In particularly contemplated aspects, the bottom product from the secondary absorber is fed as a semi-lean solvent to an intermediate position of the primary absorber, and to still further reduce residual H2S it is preferred to include a H2S scavenger unit downstream of the desulfurization section and upstream of the decarbonization section. Most typically, the second solvent is flashed in the decarbonization section to a degree sufficient to provide a large part or even all of cooling requirements for the second solvent (prior to entry into the CO2 absorber). In especially preferred aspects, flashing of the second solvent involves use of a hydraulic turbine that extracts power from pressure reduction to thereby drive a solvent pump while at the same time chilling the solvent to a lower temperature. While not limiting to the inventive subject matter, it is generally preferred that the decarbonization section comprises a compressor to compress the flashed CO2 to a pressure suitable for liquefaction and/or sequestration.

Where the syngas is shifted syngas, it is generally preferred that the first and second solvent are the same and that they are circulated between the desulfurization section and the decarbonization section. In such configurations, the CO2 absorber is preferably coupled to the primary and/or secondary absorber to allow feeding of a portion of CO2 enriched second solvent from the CO2 absorber to the primary and/or secondary absorber. Moreover, and where desirable, the desulfurization section will include a first and a second stripping column. In such configurations, it is typically contemplated that the first stripping column allows removal of H2 from H2S enriched first solvent, and that the second stripping column allows feeding of regenerated first solvent from the second stripping column to the CO2 absorber as a lean solvent. In still further contemplated aspects, a sulfur plant may be fluidly coupled to the second stripping column to receive the H2S rich overhead from the second stripping column. Additionally, contemplated plants will preferably include an expansion device and flash vessel coupled to the primary absorber, which are typically configured to allow separation of CO2 and/or H2 from the rich solvent of the primary absorber.

Where the syngas is un-shifted syngas, it is generally preferred that contemplated plants will further include a shift reactor fluidly coupled between the primary and secondary absorber to shift the partially or totally desulfurized syngas from the primary absorber. In such plant configurations, it is typically preferred that the first solvent is a chemical solvent and that the second solvent is a physical solvent. Most typically, such plants will include an expansion device and flash vessel coupled to the primary absorber to allow separation of CO2 and/or H2 from rich solvent of the primary absorber, which may advantageously be recompressed and recycled back to the primary absorber (or other destination, including combustor). Where desired, contemplated configurations may further include a tail gas absorber, a sulfur plant, and tail gas unit coupled to the desulfurization section to feed the tail gas from the tail gas unit to the tail gas absorber. In such configurations, the tail gas absorber preferably receives a lean solvent from a stripper in the desulfurization section and provides a semi-lean solvent to the primary absorber.

Therefore, in one aspect of the inventive subject matter, a syngas treatment plant will include a gasification unit that produces a shifted syngas, and a desulfurization section fluidly coupled to the gasification unit to receive the shifted syngas. Preferably, the desulfurization section includes a primary absorber, a COS hydrolysis unit, and a secondary absorber, where the primary absorber is upstream of the COS hydrolysis unit, and where the COS hydrolysis unit is upstream of the secondary absorber. The primary and secondary absorbers absorb H2S from the syngas in a solvent to produce a desulfurized syngas, and a decarbonization section receives the desulfurized syngas. In such plants, a CO2 absorber absorbs CO2 from the desulfurized syngas and produces a H2 product stream using the solvent, wherein the solvent is circulated between the desulfurization section and the decarbonization section. It should be noted that the COS hydrolysis unit is only required when the syngas contains significant amount of the COS components and may not be required if the COS is completely removed in the upstream units.

In another aspect of the inventive subject matter, a syngas treatment plant will include a gasification unit that produces an un-shifted syngas, and a desulfurization section that receives the syngas. The desulfurization section typically includes a primary absorber, a shift reactor, a COS hydrolysis unit, and a secondary absorber, wherein the primary absorber is upstream of the COS hydrolysis unit, and wherein the COS hydrolysis unit is upstream of the secondary absorber. In especially preferred aspects, the shift reactor is fluidly coupled between the primary and secondary absorber and receives the partially desulfurized syngas from the primary absorber, and the primary and secondary absorbers are configured to absorb H2S from the syngas in a first solvent to thereby produce a desulfurized syngas. It is further contemplated that a decarbonization section receives the desulfurized syngas and includes a CO2 absorber to absorb CO2 from the desulfurized syngas and produces a H2 product stream using a second solvent.

Various objects, features, aspects and advantages of the present invention will become more apparent from the following detailed description of preferred embodiments of the invention.

BRIEF DESCRIPTION OF THE DRAWING

Prior Art

DETAILED DESCRIPTION

Figure 1:
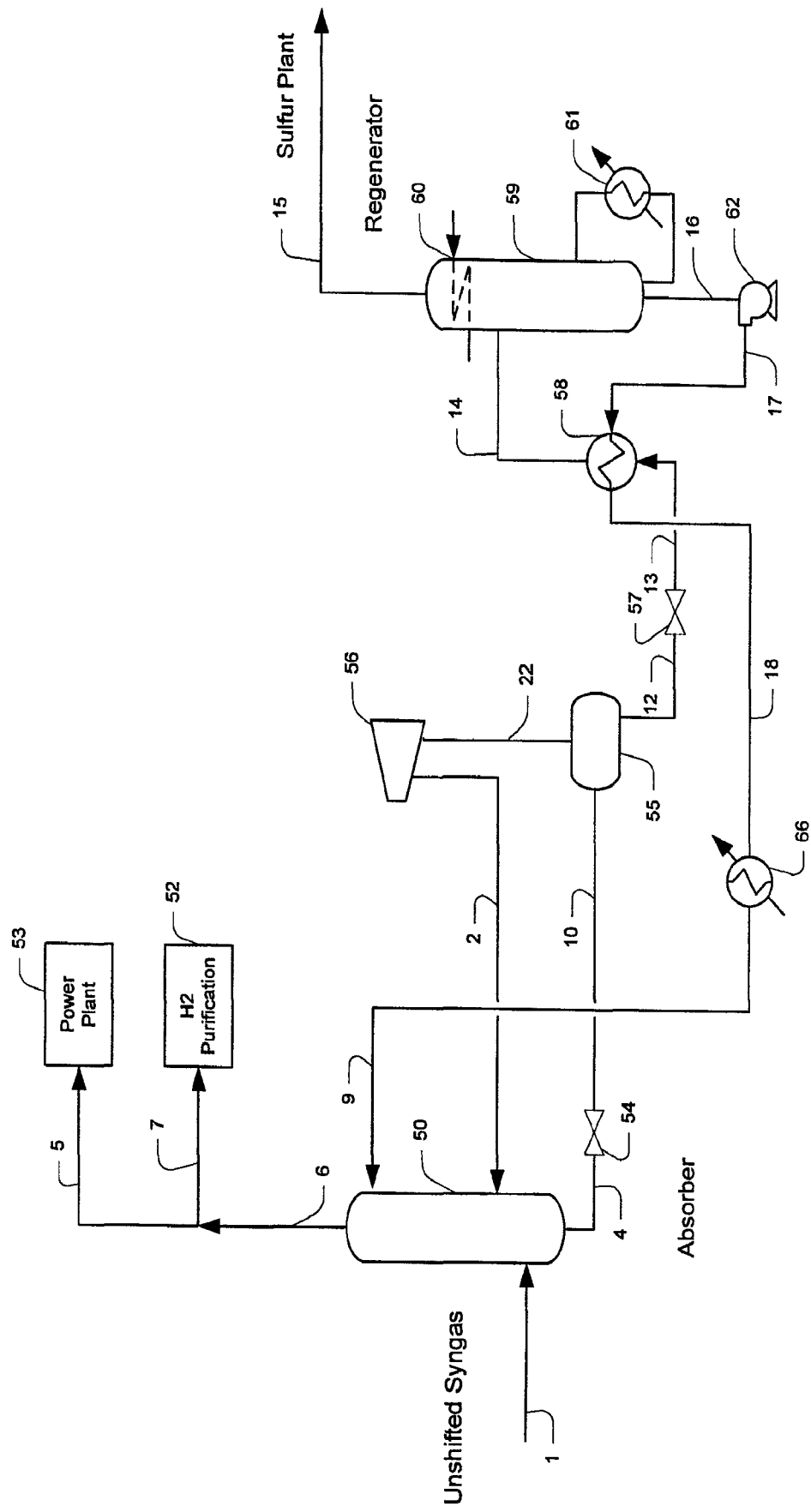
FIG. 1 is an exemplary known configuration of syngas desulfurization.

The present invention is directed to plant configurations and methods for treatment of syngas gas comprising H2, $CO_2$, CO, $H_2S$, and COS, in which hydrogen sulfide is removed in a first section, and in which carbon dioxide is removed in a second section. Contemplated sections include absorbers in which a single solvent or separate and distinct solvents are used to absorb the respective acid gas components. $H_2S$ rich solvent is preferably regenerated in one or more strippers using external heat, while $CO_2$ rich solvent is preferably regenerated by flashing of the solvent to lower pressures. In especially preferred plants, $H_2S$ absorption is performed upstream of $CO_2$ absorption.

Where the carbon dioxide concentration in the syngas is relatively low (e.g., unshifted syngas), the solvent circulation and the solvent type for the $H_2S$ and $CO_2$ absorber sections may be separate and different. On the other hand, where the carbon dioxide concentration in the syngas is relatively high (e.g., shifted syngas), the $H_2S$ and $CO_2$ absorber sections are integrated such that solvent circulation for the $H_2S$ absorber section may receive $CO_2$-loaded lean and $H_2S$ depleted solvent from the $CO_2$ absorber section. Therefore, the solvent in such circumstances may be the same (i.e., the solvents will have the same formulation regardless of particular loading with $CO_2$, COS, and/or $H_2S$. For example, N-methyl-diethanolamine (MDEA) fully loaded with $H_2S$ and partially loaded with $CO_2$ is considered the same solvent as regenerated MDEA or MDEA without $H_2S$ and partially loaded with $CO_2$).

It should be appreciated that such configurations and methods will provide numerous advantages without expenditure of additional energy or material. For example, contemplated configurations and methods significantly reduce, or even almost entirely eliminate $CO_2$ and sulfurous emissions while recovering a $CO_2$ product for sequestration and producing $H_2$ for clean power generation. Where the syngas is un-shifted, solvent flow to the $H_2S$ absorber may be reduced by utilizing at least a portion of tail gas absorber bottom as semi-lean solvent. It should also be appreciated that substantially all carbon may be captured by compressing the treated tail gas for $CO_2$ sequestration.

In particularly contemplated configurations, synthesis gas is treated in two serial and preferably $H_2S$ selective absorption steps with an intermediate COS hydrolysis step. The residual $H_2S$ is then removed by downstream $H_2S$ scavenger beds to produce a treated gas with a total sulfur content of below 50-100 ppmv, more typically below 10 ppmv, and most typically below 4 ppmv. Where the syngas is un-shifted, it should be appreciated that the COS hydrolysis unit may be combined with a shift unit. On the other hand, where the syngas is already shifted, $CO_2$ absorption in the desulfurization section may be reduced by use of a $CO_2$ loaded solvent in the $H_2S$ absorbers, which further reduces solvent circulation. In such methods and configurations, it is generally preferred that the $H_2S$ loaded rich solvent from the $H_2S$ absorbers is regenerated in two stripping steps. The first stripping step recovers the co-absorbed $H_2$ and reduces $CO_2$ content of the rich solvent using a stripping gas (e.g., $N_2$ or $H_2$), while the second stripping step further heats and regenerates the rich solvent to thereby produce a lean solvent depleted of acid gases and an acid gas enriched in $H_2S$.

In further contemplated aspects, the desulfurized syngas gas from the $H_2S$ absorbers is treated in a $CO_2$ absorption step, preferably by a regenerated solvent to thus produce a $CO_2$ loaded rich solvent. The so formed rich solvent is then regenerated by flashed regeneration at various pressures. Such processes remove almost all the $CO_2$ and produce a $H_2$ product with very low $CO_2$ content (at typically less than 2 mol %, and more typically less than 1 mol %) and a $CO_2$ product with low $H_2S$ content (typically less than 100 ppm, and most typically less than 10 ppm) that is safe for pipeline transmission. Moreover, it should be appreciated that use of hydraulic turbines in the flashing process recovers at least a portion of the power required by the circulation pumps while chilling the solvent. Thus, the solvent refrigeration requirements are substantially reduced (e.g., at least 50%, more typically at least 70%, most typically at least 80%) and in some cases even almost entirely eliminated.

Figure 2:
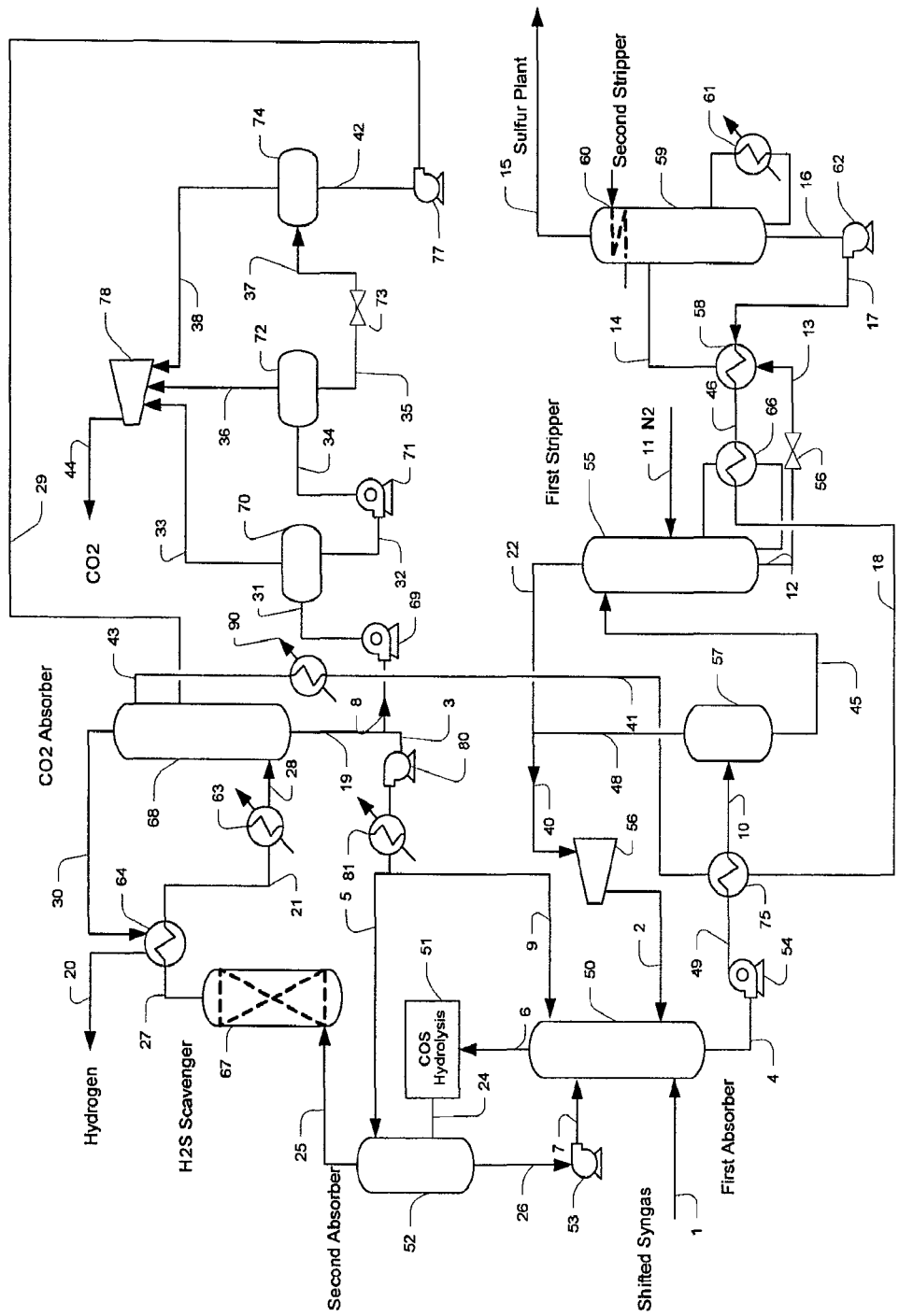
FIG. 2 is an exemplary configuration for removal of CO2 and H2S from shifted syngas using a single solvent system.

One exemplary configuration for processing shifted syngas is depicted in FIG. 2. Here, feed gas stream 1, typically at 700 to 900 psig and at ambient temperature (e.g., about 75° F.), is treated in the first absorber 50 using $CO_2$ loaded lean solvent stream 9, producing a $H_2S$ rich bottom stream 4 and a $H_2S$ depleted overhead stream 6. $H_2S$ semi-lean solvent, stream 7, produced from the second absorber 52 is fed via stream 26 and pump 53 to the upper section of the first absorber to reduce solvent circulation. The rich solvent from the first absorber is letdown in pressure via hydraulic turbine 54 (or alternatively, for example, a JT valve), heated in exchanger 75 via stream 49, typically at 150 to 300 psig and fed to separator 57 via stream 10. The flashed vapor stream 48 is compressed in compressor 56 and routed as stream 2 to the first absorber. The flashed liquid stream 45 is fed to the first stripper 55 that concentrates the $H_2S$ content in the rich solvent and recovers the co-absorbed $H_2$. Typically, stripper 55 uses an inert gas 11 such as $N_2$ that is typically a waste by-product from an air separation plant. Optionally, reboiler 66 is used to supplement the stripping duty of the first stripper, utilizing the waste heat from the lean solvent from the second stripper (or other source). The first stripper 55 produces an overhead gas stream 22 that is combined with stream 48 to form stream 40, which is compressed by compressor 56 and recycled back to the first absorber 50. As used herein, the term "about" in conjunction with a numeral refers to a range of +/-10% (inclusive) of that numeral. For example, the term "about 200 psia" refers to a range of 180 psia to 220 psia, inclusive. Similarly, the term about -40° F. refers to a temperature range of between -44° F. to -36° F.

The first stripper bottom stream 12 is letdown in pressure via letdown valve 56 to form stream 13 at a pressure close to atmospheric pressure. Stream 13 is fed to exchanger 58 forming stream 14, typically about 200 to 280° F. The hot rich solvent is regenerated using the second stripper 59, which is reboiled with reboiler 61 and refluxed with ambient air cooler 60. Note that cooler 60 can be externally mounted complete with knock-out drum and pumps (not shown). The second stripper produces acid gas stream 15, typically comprising over 50 mol % of $H_2S$ (on a dry basis), which is suitable as a feed gas to a sulfur plant. Regenerated solvent 16 is pumped by pump 62 and cooled in exchangers 58, 66, 75, and 90 via streams 17, 46, 18, and 41 forming lean solvent stream 43 that is fed to $CO_2$ absorber 68. Most typically, the shifted syngas predominantly comprises $H_2$, $CO_2$, CO, $H_2S$, COS and has a composition as indicated in Table 1 below:

TABLE 1

| COMPONENT | MOL % |
|---|---|
| $H_2S$ | 1.3 |
| $CO_2$ | 34.4 |
| COS | 0.04 |
| CO | 2.0 |
| $H_2$ | 61.9 |
| $N_2$ | 0.1 |
| AR | 0.2 |
| $CH_4$ | 0.2 |

With respect to suitable solvents it should be appreciated that the nature of the solvent may vary considerably in such configurations. However, particularly preferred solvents include those comprising dialkylethers of polyethylene glycols, propylene carbonate, MDEA, etc. Similarly, with respect to sulfur scavengers it is generally preferred that type of sulfur scavenger may vary. However, it is preferred that the scavenger will reduce H2S levels to typically less than 4 ppmv, and most typically less than 1 ppmv, thus producing H2 and CO2 products that are almost completely depleted in H2S. For example, suitable sulfur scavengers include those comprising metallic oxides (e.g., iron oxide, zinc oxide) and/or non-specific adsorbents (e.g., molecular sieves).

In should still further be noted that COS absorption by certain solvents (and especially physical solvents) is often difficult and incomplete, and typically only about 33% of COS is removed. Consequently, it is preferred that residual COS from the first absorber 50, is sent via stream 6 to COS hydrolysis unit 51. The COS hydrolysis reaction is particularly effective in a H2S depleted environment, according to the following chemical reaction equation:

$$COS + H_2O \leftrightarrow H_2S + CO_2$$

The COS depleted stream 24 (with reduced H2S concentration as compared to stream 1) is further treated with CO2 loaded solvent stream 5 in a second absorber 52, producing a further H2S depleted syngas stream 25, and a H2S semi-lean bottom stream 26. Stream 25 (or at least a portion of stream 25) is treated in a sulfur scavenger bed 67, which can effectively remove the residual H2S and COS to very low levels, typically below 1 ppmv. Treated gas stream 27 is further cooled in exchanger 64 to stream 21 and exchanger 63 forming stream 28, typically at about 30 to 50° F., and fed to CO2 absorber 68. The CO2 absorber is scrubbed with lean solvent stream 5 and stream 29, producing a CO2 loaded rich solvent stream 19 and a CO2 depleted overhead vapor, stream 30. The overhead vapor 30 is heated in exchanger 64 producing stream 20, the H2 product. To reduce overall solvent circulation, one portion of the CO2 loaded solvent stream 3 is pumped and chilled (via pump 80 and cooler 81) for use as the CO2 loaded solvent to the absorbers.

The remaining portion of the CO2 rich solvent, stream 8, is letdown in pressure in hydraulic turbine 69 forming stream 31, typically at 200 to 400 psig. The power generated by the hydraulic turbine is used to provide at least a portion of the power required by lean solvent pump 77. Flash drum 70 produces a separator gas stream 33 and a flashed liquid stream 32. The flashed gas is fed to the high pressure stage of CO2 compressor 78 forming compressed CO2 product 44, and the flashed liquid is further letdown in pressure in hydraulic turbine 71 forming stream 34, typically at 60 to 200 psig. Flash drum 72 produces a separator gas stream 36 and a flashed liquid stream 35. The flashed gas is fed to the medium pressure stage suction inlet of CO2 compressor 78, and the flashed liquid is further letdown in pressure via valve 73 forming stream 37 at atmospheric or vacuum pressure. Flash drum 74 produces an atmospheric and/or vacuum pressure vapor stream 38 and a flashed liquid stream 42 that is further pumped by pump 77 forming lean solvent stream 29. It should be appreciated that the use of hydraulic turbines and the cooling effect from flashing of the CO2 at lower pressures results in self-chilling of the solvent, eliminating refrigeration cooling requirements.

Figure 3:
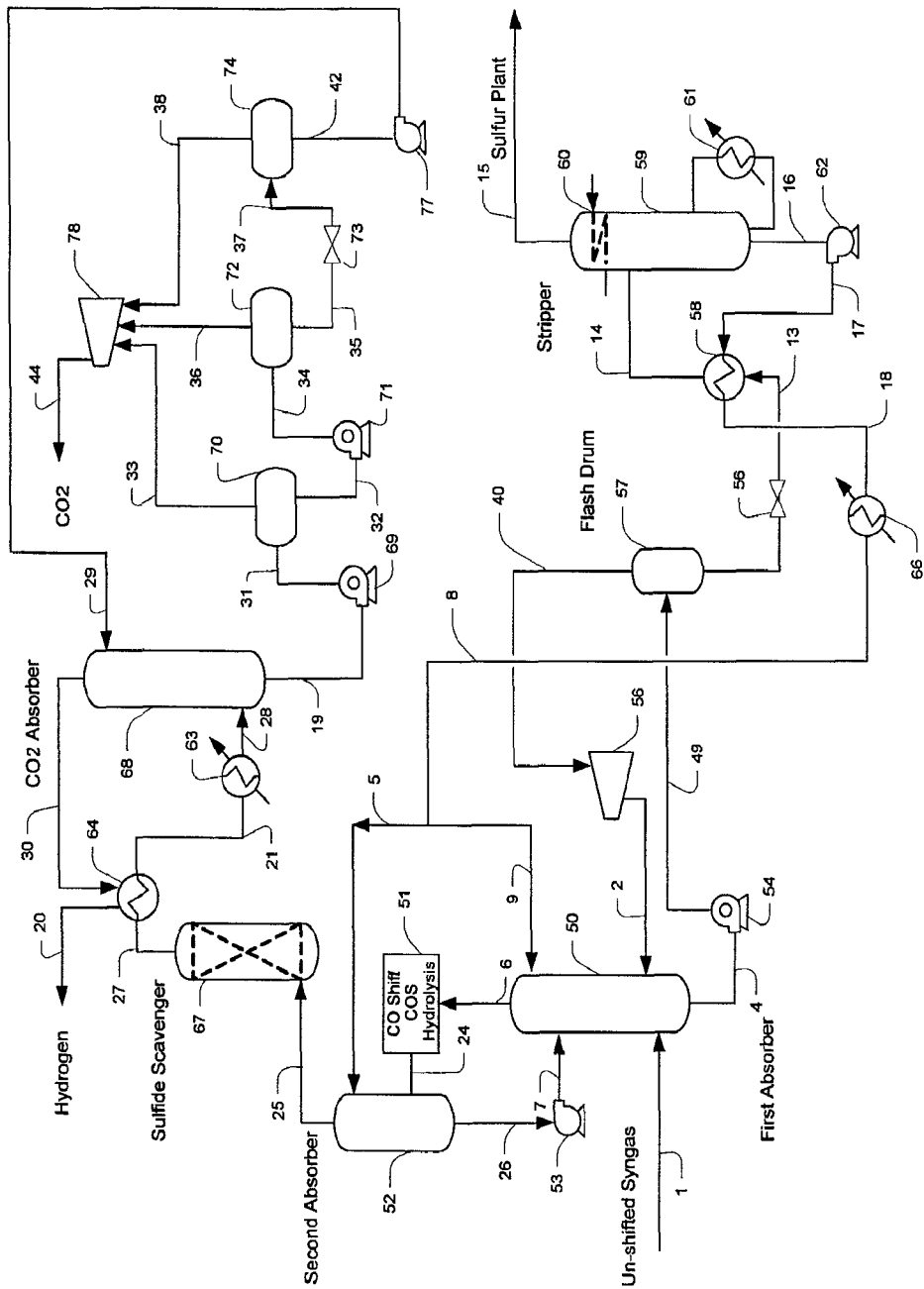
FIG. 3 is an exemplary configuration for removal of CO2 and H2S from un-shifted syngas using a dual solvent system.

Similar to the configuration as depicted in FIG. 2, methods and configurations may be employed to process un-shifted syngas. One such exemplary configuration is depicted in FIG. 3. A typical un-shifted gas composition is shown in Table 2 below:

TABLE 2

| COMPONENT | MOL % |
|---|---|
| H2S | 1.5 |
| CO2 | 4.3 |
| COS | 0.02 |
| CO | 52.6 |
| H2 | 41.1 |
| N2 | 0.2 |
| Ar | 0.2 |
| CH4 | 0.2 |

In this configuration, the water shift reactors are located downstream of the first absorber. The shift reaction of the treated syngas converts most of the CO content using water shift reaction to H2 and CO2 according to the following chemical reaction equation:

$$CO + H_2O \leftrightarrow H_2 + CO_2$$

The shift reactors also convert most of the COS to H2S according to the following chemical reaction equation:

$$COS + H_2O \leftrightarrow H_2S + CO_2$$

As noted in Table 2, CO2 content in the un-shifted syngas, stream 1, is significantly lower than the shifted gas case. Due to the lower CO2 to H2S molar ratio in the un-shifted syngas, CO2 co-absorption by the solvent is significantly lower. As a result, use of the first stripper for H2S enrichment and use of CO2 loaded solvent for H2S absorption are typically not needed. In addition, the H2S and CO2 absorption can be separate and different types of solvent can be used, making this configuration especially suitable for revamping existing sulfur removal units for CO2 sequestration. Consequently, the regenerated solvent for H2S absorption 8 is provided by stripper 59, and stream 3 of FIG. 2 is not present. Furthermore, stream 45 of FIG. 2 is directly routed to the stripper 59 in FIG. 3 as streams 13/14. In this configuration, the H2S content in acid gas stream 15 is typically over 60% (on dry basis). With respect to the remaining components and configurations, the same considerations and contemplations apply in FIG. 3 for like items of FIG. 2.

Figure 4:
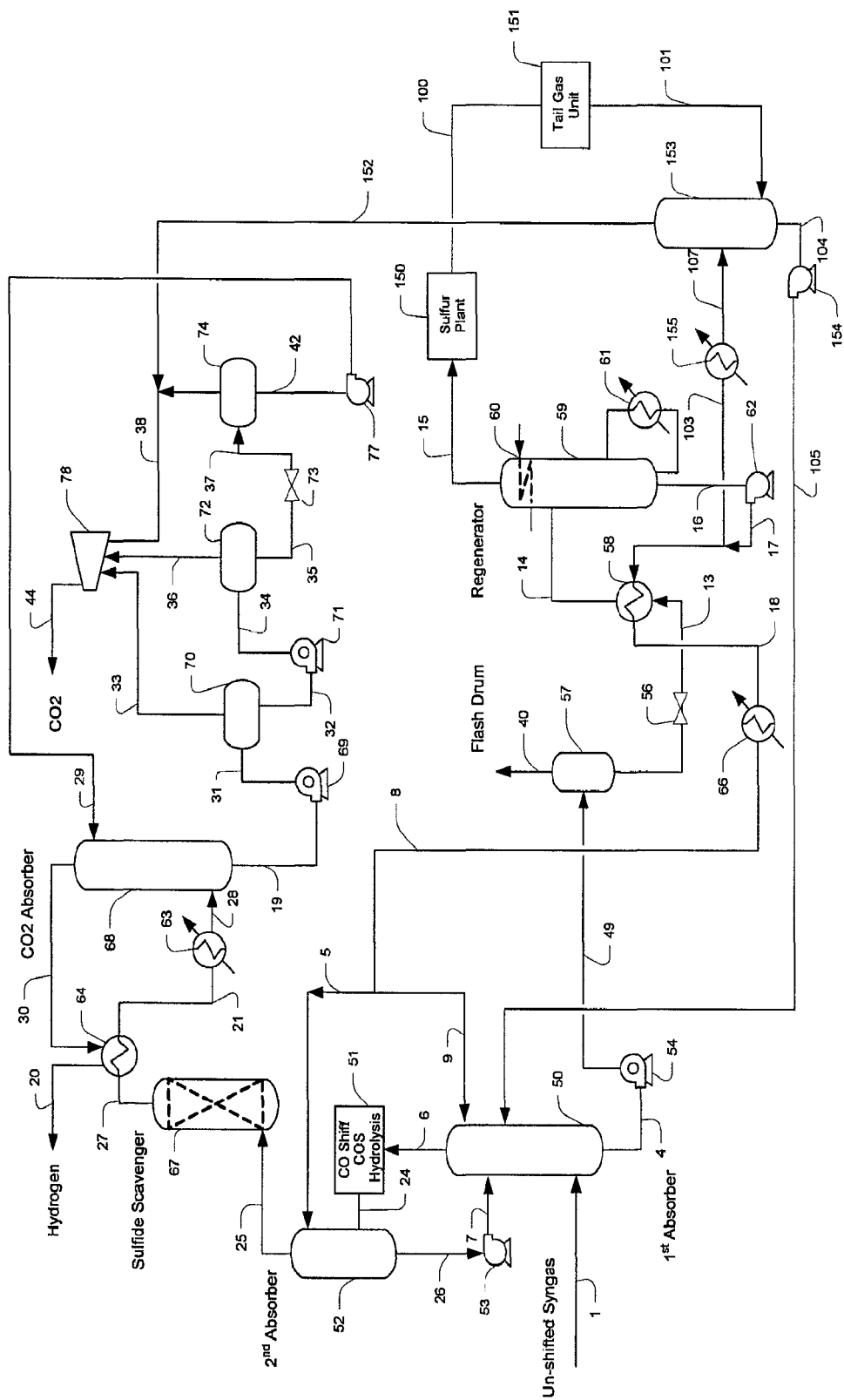
FIG. 4 is an exemplary configuration according to FIG. 3 with integrated sulfur plant and tail gas unit.

Contemplated methods and configurations are also applicable to process un-shifted syngas using H2S selective chemical solvents (e.g., MDEA) as shown in FIG. 4 where a sulfur plant and tail gas unit are integrated. In this configuration, the first and second H2S absorbers are scrubbed with the chemical solvent that preferentially absorbs H2S over CO2 in an overall configuration similar to that of FIG. 3. MDEA selective absorption is typically favored by low lean amine temperature and short contact time in the absorbers. Most typically, CO2 slippage in the absorber is about 30% to 50%, resulting in an acid gas stream 15 containing about 30% to 50% H2S (dry basis). Stream 40 from the flash drum can be recycled to the absorber or can be used as fuel in a downstream combustion process.

The acid gas stream from regenerator 59 is further processed in sulfur plant 150 that preferably uses oxygen from an air separation plant for sulfur conversion. With the use of an oxygen blown sulfur plant, the sulfur plant size is smaller, and effluent stream 100 comprises mainly CO2, is depleted of other contaminants (e.g., N2), and is subsequently suitable for CO2 sequestration. Stream 100 is preferably hydrogenated using a catalyst in the tail gas unit 151, converting residual sulfur oxides to H2S, thus producing stream 101. The H2S content in the hydrogenated gas is scrubbed in tail gas absorber 153 using a portion of the lean solvent from the regenerator 59 via pump 62 and stream 17. The lean amine stream 103 is cooled in cooler 155 to about 80° F. forming stream 107 and fed to the tail gas absorber 153. The tail gas absorber typically contains about 12 to 16 trays and produces an overhead stream 152 with less than 200 ppmv H2S content. CO2 slip in the tail gas absorber is typically 80% to 90%. The overhead stream 152, containing almost pure CO2, is further compressed in CO2 compressor 78 forming a portion of the CO2 product stream 44. For pipeline transportation, a dehydration unit (not shown) may be added to minimize pipeline corrosion in cold climate operation. It should be appreciated that in these methods and configurations almost all CO2 produced in the syngas process is recovered for CO2 sequestration. Alternatively, the tail gas absorber overhead gas can be sent to an incinerator for sulfur destruction prior to release to the atmosphere.

The tail gas absorber bottom stream 104 is pumped by pump 154 forming stream 105 and fed as semi-lean amine to the first absorber. Stream 105 can also be further chilled (not shown) to enhance acid gas absorption in the first absorber. With the use of semi-lean amine, the lean amine flow rate (stream 8), and regeneration reboiler 61 duty are significantly reduced. For the CO2 absorber section, the use of physical solvent such as propylene carbonate and ethers of polyglycols is preferred over amine for energy savings. The same method of flash solvent regeneration previously described in FIGS. 2 and 3 is applicable here. It should also be noted that the tail gas unit and absorber configuration presented in FIG. 4 is applicable to the previously described configuration of FIG. 2. With respect to the remaining components and configurations, the same considerations and contemplations apply in FIG. 4 for like items of FIG. 3.

Thus, specific embodiments and applications of CO2 and H2 production from syngas have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A plant comprising:
   a gasification unit configured to produce a syngas;
   a desulfurization section fluidly coupled to the gasification unit to receive the syngas, wherein the desulfurization section includes a primary absorber, a COS hydrolysis unit, a secondary absorber, and a regenerator that is configured to produce an H2S acid gas stream;
   wherein the primary absorber is upstream of the COS hydrolysis unit, and wherein the COS hydrolysis unit is upstream of the secondary absorber;
   wherein the primary and secondary absorbers are configured to absorb H2S from the syngas in a first solvent to thereby produce a desulfurized syngas;
   a decarbonization section fluidly coupled to the desulfurization section to receive the desulfurized syngas and comprising a CO2 absorber that is configured to absorb CO2 from the desulfurized syngas and to produce a H2 product stream using a second solvent, wherein first and second solvents are circulated in separate solvent circuits;
   a sulfur plant with a tail gas unit that is fluidly coupled to the regenerator and that is configured to produce sulfur from the H2S acid gas stream and a tail gas;
   a third absorber that is fluidly coupled to the tail gas unit and that is configured to form a semi-lean solvent using lean solvent from the regenerator and to form a CO2 overhead; and
   wherein the third absorber is fluidly coupled to the primary absorber such that the semi-lean solvent is provided to the primary absorber.

2. The plant of claim 1 wherein primary and secondary absorbers are configured to allow feeding of a bottom fluid from the secondary absorber as a semi-lean solvent to an intermediate position of the primary absorber.

3. The plant of claim 1 further comprising a H2S scavenger unit fluidly coupled between the desulfurization section and the decarbonization section.

4. The plant of claim 1 wherein the decarbonization section is configured to allow flashing of the second solvent to a degree sufficient to provide all cooling requirement for the second solvent prior to entry into the CO2 absorber.

5. The plant of claim 1 wherein the decarbonization section comprises a hydraulic turbine that is configured to provide power from pressure reduction of the second solvent to a solvent pump of the second solvent.

6. The plant of claim 1 wherein the decarbonization section further comprises a compressor that is configured to allow compression of flashed CO2 to a pressure suitable for at least one of liquefaction and sequestration.

7. The plant of claim 1 wherein the gasification unit is configured to produce an un-shifted syngas, and wherein the plant further comprises a shift reactor fluidly coupled between the primary and secondary absorber and configured to receive partially desulfurized syngas from the primary absorber.

8. The plant of claim 7 wherein the first solvent is a chemical solvent and the second solvent is a physical solvent.

9. The plant of claim 7 further comprising an expansion device and flash vessel coupled to the primary absorber and configured to allow separation of CO2 from rich solvent of the primary absorber.

10. The plant of claim 9 wherein the flash vessel is configured to allow feeding of a flashed vapor to at least one of the primary absorber and a combustor.

11. The plant of claim 7 further comprising a tail gas absorber, and a sulfur plant and tail gas unit fluidly coupled to the desulfurization section and configured to allow feeding of tail gas from the tail gas unit to the tail gas absorber.

12. The plant of claim 11 wherein the tail gas absorber is configured to receive lean first solvent from a stripper, and wherein the tail gas absorber is further configured to provide a semi-lean solvent to the primary absorber.

13. A syngas treatment plant comprising:
   a gasification unit configured to produce a shifted syngas;
   a desulfurization section fluidly coupled to the gasification unit to receive the shifted syngas, wherein the desulfurization section includes a primary absorber and receives the shifted syngas, a COS hydrolysis unit, a secondary absorber, and a regenerator that is configured to produce an H2S acid gas stream;
   wherein the primary absorber is upstream of the COS hydrolysis unit, and wherein the COS hydrolysis unit is upstream of and directly coupled to the secondary absorber;

wherein the primary and secondary absorbers are configured to absorb H2S from the syngas in first and second respective portions of a CO2-loaded solvent to thereby produce a desulfurized syngas;

a decarbonization section fluidly coupled to the desulfurization section to receive the desulfurized syngas and comprising a CO2 absorber that is configured to absorb CO2 from the desulfurized syngas and to produce the CO2-loaded solvent and a H2 product stream using the solvent;

a cooler that is configured to cool the CO2-loaded solvent;

wherein the solvent is circulated between the desulfurization section and the decarbonization section; and a sulfur plant with a tail gas unit that is fluidly coupled to the regenerator and that is configured to produce sulfur from the H2S acid gas stream and a tail gas;

a third absorber that is fluidly coupled to the tail gas unit and that is configured to form a semi-lean solvent using lean solvent from the regenerator and to form a CO2 overhead; and wherein the third absorber is fluidly coupled to the primary absorber such that the semi-lean solvent is provided to the primary absorber.

14. A syngas treatment plant comprising:

a gasification unit configured to produce an un-shifted syngas;

a desulfurization section fluidly coupled to the gasification unit to receive the syngas, wherein the desulfurization section includes a primary absorber, a shift reactor, a COS hydrolysis unit, a secondary absorber, and a regenerator that is configured to produce an H2S acid gas stream;

wherein the primary absorber is upstream of the COS hydrolysis unit, and wherein the COS hydrolysis unit is upstream of the secondary absorber;

wherein the shift reactor is fluidly coupled between the primary and secondary absorber and configured to receive partially desulfurized syngas from the primary absorber;

wherein the primary and secondary absorbers are configured to absorb H2S from the syngas in a first solvent to thereby produce a desulfurized syngas;

a decarbonization section fluidly coupled to the desulfurization section to receive the desulfurized syngas and comprising a CO2 absorber that is configured to absorb CO2 from the desulfurized syngas and to produce a H2 product stream using a second solvent, wherein first and second solvents are circulated in separate solvent circuits; and a sulfur plant with a tail gas unit that is fluidly coupled to the regenerator and that is configured to produce sulfur from the H2S acid gas stream and a tail gas;

a third absorber that is fluidly coupled to the tail gas unit and that is configured to form a semi-lean solvent using lean solvent from the regenerator and to form a CO2 overhead; and wherein the third absorber is fluidly coupled to the primary absorber such that the semi-lean solvent is provided to the primary absorber.

* * * * *